US009642054B2

(12) United States Patent
Kitazoe

(10) Patent No.: US 9,642,054 B2
(45) Date of Patent: *May 2, 2017

(54) RADIO RESOURCE CONNECTION (RRC) ESTABLISHMENT FOR WIRELESS SYSTEMS

(71) Applicant: QUALCOMM Incorporated, San Diego, CA (US)

(72) Inventor: Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 14/601,998

(22) Filed: Jan. 21, 2015

(65) Prior Publication Data

US 2015/0131617 A1    May 14, 2015

Related U.S. Application Data

(63) Continuation of application No. 11/971,847, filed on Jan. 9, 2008, now Pat. No. 9,060,316.

(Continued)

(51) Int. Cl.
*H04W 4/00* (2009.01)
*H04W 36/10* (2009.01)
(Continued)

(52) U.S. Cl.
CPC ....... *H04W 36/10* (2013.01); *H04W 36/0033* (2013.01); *H04W 36/0072* (2013.01);
(Continued)

(58) Field of Classification Search
None
See application file for complete search history.

(56) References Cited

U.S. PATENT DOCUMENTS 6,445,918 B1 * 9/2002 Hellander ............. H04W 76/02
                                               370/331
6,577,607 B1    6/2003 Mitts et al.
(Continued)

FOREIGN PATENT DOCUMENTS

CN     1663166 A    8/2005
EP     1337125 A2   8/2003
(Continued)

OTHER PUBLICATIONS

Qualcomm Europe: "Forward Handover Considerations", 3GPP TSG-RAN WG2#56 R2-063380, Nov. 1, 2006, pp. 1-6, URL: http://www.3gpp.org/ftp/tsg_ran/WG2_RL2/TSGR2_56/Documents/R2-063380.zip.

(Continued)

*Primary Examiner* — Steven H Nguyen
(74) *Attorney, Agent, or Firm* — Anthony R. Morris

(57) ABSTRACT

Methods and systems for re-establishing radio contact include, for example, a method for performing a wireless handoff for user equipment (UE) as the UE performs a handoff from a source extended Node-B (e-NB) to a target e-NB is disclosed. The method includes detecting a radio link failure (RLF) between the UE and the source e-NB by the UE, and maintaining an active communication service at a service layer of the UE after detecting the RLF and as the UE performs the handoff from the source e-NB to the target e-NB such that the communication service remains continuously active during the handoff, the communication service supporting a first communication between the UE and a third party.

31 Claims, 7 Drawing Sheets

Related U.S. Application Data

(60) Provisional application No. 60/884,387, filed on Jan. 10, 2007.

(51) Int. Cl.
*H04W 36/00* (2009.01)
*H04W 76/02* (2009.01)
*H04W 88/02* (2009.01)
*H04W 76/04* (2009.01)

(52) U.S. Cl.
CPC .......... *H04W 76/027* (2013.01); *H04W 76/04* (2013.01); *H04W 88/02* (2013.01)

(56) References Cited

U.S. PATENT DOCUMENTS

| | | |
|---|---|---|
| 7,630,712 B2 | 12/2009 | Altshuller et al. |
| 7,764,660 B2 | 7/2010 | Verma et al. |
| 9,060,316 B2 * | 6/2015 | Kitazoe ............. H04W 36/0033 |
| 2002/0068572 A1 | 6/2002 | Chun et al. |
| 2002/0068586 A1 | 6/2002 | Chun et al. |
| 2005/0101326 A1 | 5/2005 | Kang et al. |
| 2005/0255870 A1 | 11/2005 | Chang et al. |
| 2006/0135162 A1 | 6/2006 | Julian et al. |
| 2008/0049674 A1 | 2/2008 | Cha et al. |
| 2008/0167042 A1 | 7/2008 | Kitazoe |
| 2008/0167089 A1 * | 7/2008 | Suzuki .................. H04L 1/1829 455/574 |

FOREIGN PATENT DOCUMENTS

| | | |
|---|---|---|
| EP | 1392075 A1 | 2/2004 |
| EP | 1441469 A2 | 7/2004 |
| EP | 1471762 A2 | 10/2004 |
| JP | 2000513554 A | 10/2000 |
| JP | 2005531223 A | 10/2005 |
| JP | 2006279261 A | 10/2006 |
| JP | 2007503761 A | 2/2007 |
| JP | 2008510394 A | 4/2008 |
| KR | 100318940 | 12/2001 |
| RU | 2263400 | 10/2005 |
| RU | 2267224 | 12/2005 |
| WO | WO-0215420 A2 | 2/2002 |
| WO | WO-2004002051 A2 | 12/2003 |
| WO | WO-2005009069 | 1/2005 |
| WO | WO-2006020977 A1 | 2/2006 |
| WO | WO-2006033940 A2 | 3/2006 |

OTHER PUBLICATIONS

3GPP TSG RAN: "3rd Generation Partnership Project; Technical Specification Group Radio Access Network; HSPA Evolution beyond Release 7 (FOO); (Release 7); 3GPP TR 25.999 VO.3.1" Internet Citation, [Online] Oct. 18, 2006 (Oct. 18, 2006), XP002475151 Retrieved from the Internet: URL:http://www.3gpp.org/ftp/Specs/html-info/25999.htm> [retrieved on Apr. 1, 2008].
Dorot V., et al., "An Explanatory Dictionary of Modern Computer Terms," 2nd Edition, 2001, 'Program Product' on p. 339, BHV—Petersburg Publishers, Saint Petersburg.
International Search Report—PCT/US08/050717—international Search Authority—European Patent Office—Jun. 27, 2008.
Nevdyaev L.M., Telekommunikatsionnie Tekhnologii, Anglo-russkiy tolkovy slovar-spravochnik (Telecommunication Technologies, English-Russian explanatory dictionary and reference book), Svyaz' i Biznes, Moscow, 2002, pp. 103, 136—L.4.
Nojun, Kwak Samsung, Future Converged Radio Access System, Jun. 27, 2006, pp. 1-30, XP002484387.
Samsung: "Relocation of AGW for L TE_Active Ues" Internet Citation, [Online] Apr. 3, 2006 (Apr. 3, 2006), XP002453513 Retrieved from the Internet: URL:http://www.3gpp.org/ftp/tsg_ran/WG3_lu ITSGR3_51 bis/docs/R3-060439.zip> [retrieved on Oct. 1, 2007].
Taiwan Search Report—TW097101030—TIPO—Apr. 25, 2011.
Written Opinion—PCT/US08/050717, International Search Authority, European Patent Office, Jun. 27, 2008.
European Search Report—EP16157014—Search Authority—The Hague—Jun. 1, 2016.

* cited by examiner

RADIO RESOURCE CONNECTION (RRC) ESTABLISHMENT FOR WIRELESS SYSTEMS

CLAIM OF PRIORITY UNDER 35 U.S.C. §120

This application is a Continuation of U.S. patent application Ser. No. 11/971,847, filed Jan. 9, 2008, which claims priority of U.S. Provisional Patent Ser. No. 60/884,387, filed on Jan. 10, 2007, which are expressly incorporated by reference herein in its entirety.

BACKGROUND

I. Field

The following description relates generally to wireless networks, for example radio resource connection (RRC) in wireless communication systems, such as E-UTRAN.

II. Background

Wireless communication networks are commonly used to communicate information regardless of where a user is located and whether a user is stationary or moving. Generally, wireless communication networks are established through a mobile device (or "access terminal") communicating with a series of base stations (or "access points").

Typically, as an access terminal moves from one location serviced by a first access point to a second location serviced by a second access point, a communication "handoff" will be performed such that the access terminal stops communication via the first access point and starts communicating via the second access point. While seemingly simple in concept, such handoffs are often very complex and wrought with problems. For instance, if the two access points in the example above are not synchronized, then the access terminal may have trouble determining if the second access point exists and/or determining critical information that would allow the access terminal to recognize and start communicating with the second access point.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

For FDMA based systems, two kinds of scheduling techniques are typically employed, including: (1) Subband Scheduling where user packets can be mapped to tone allocations confined to a narrow bandwidth and may be referred to as frequency selective scheduling (FSS) in this disclosure; and (2) Diversity Scheduling where user packets are mapped to tone allocations spanning an entire system bandwidth and may be referred to as frequency hopped scheduling (FHS) in this disclosure.

Frequency Hopping is typically employed to achieve both channel and interference diversity. From that perspective, frequency hopping within a subband may also be performed with FSS.

In a given system, however, all users may or may not always benefit from FSS. Accordingly, it may be beneficial to employ advantageous design hopping structures such that FSS and FHS users can be easily multiplexed within the same Transmission Time Interval (TTI). Thus, new technologies directed to improving handoffs between cellular devices may be useful.

SUMMARY

Various aspects and embodiments of the invention are described in further detail below.

In an embodiment, a method for performing a wireless handoff for user equipment (UE) as the UE performs a handoff from a source extended Node-B (e-NB) to a target e-NB is disclosed. The method includes detecting a radio link failure (RLF) between the UE and the source e-NB by the UE, and maintaining an active communication service at a service layer of the UE after detecting the RLF and as the UE performs the handoff from the source e-NB to the target e-NB such that the communication service remains continuously active during the handoff, the communication service supporting a first communication between the UE and a third party.

In another embodiment, an item of user equipment (UE), the UE being capable of performing a handoff from a source extended Node-B (e-NB) to a target e-NB is disclosed. The UE includes wireless communication circuitry, means for detecting a radio link failure (RLF) between the UE and the source e-NB by the UE coupled to the wireless communication circuitry, and means for maintaining an active communication service at a service layer of the UE after detecting the RLF and as the UE performs the handoff from the source e-NB to the target e-NB such that the communication service remains continuously active during the handoff, the communication service supporting a first communication between the UE and a third party.

In another embodiment, an item of user equipment (UE), the UE being capable of performing a handoff from a source extended Node-B (e-NB) to a target e-NB is disclosed. The UE includes detection circuitry configured to detect a radio link failure (RLF) between the UE and the source e-NB by the UE, and communication circuitry configured to maintain an active communication service at a service layer of the UE after detecting the RLF and as the UE performs the handoff from the source e-NB to the target e-NB such that the communication service remains continuously active during the handoff, the communication service supporting a first communication between the UE and a third party.

In another embodiment, a computer program product includes a computer-readable medium, which includes a set of one or more instructions for determining whether a radio link failure (RLF) between user equipment (UE) and a source extended Node-B (e-NB), and a set of one or more instructions for performing a wireless handoff for the UE while maintaining an active communication service at a service layer of the UE after detecting the RLF and as the UE performs the handoff from the source e-NB to the target e-NB such that the communication service remains continuously active during the handoff, the communication service supporting a first communication between the UE and a third party.

In another embodiment, a method for performing a wireless handoff for user equipment (UE) as the UE performs a handoff from a source extended Node-B (e-NB) to a target e-NB is disclosed. The method includes receiving a connection request message from the UE, the connection request message being received after a radio link failure of a communication link between the UE and source e-NB, forwarding the connection request message to a core communication network, receiving a connection setup message from the core network in response to the forwarded connection request message, and forwarding the connection setup message to the UE such that an active communication service at a service layer of the UE remains continuously active during the handoff while communication payload data transfer is re-established between the UE and a third party via the target e-NB.

In another embodiment, an extended Node-B (e-NB) capable of being used for handoff of user equipment (UE) from a source extended Node-B (e-NB) to a target e-NB is disclosed. The E-NB includes wireless communication circuitry, and processing circuitry coupled to the wireless communication circuitry, the processing circuitry being configured to receive a connection request message from the UE, the connection request message being received after a radio link failure of a communication link between the UE and source e-NB, forward the connection request message to a core communication network, receive a connection setup message from the core network in response to the forwarded connection request message, and forward the connection setup message to the UE such that an active communication service at a service layer of the UE remains continuously active during the handoff while communication payload data transfer is re-established between the UE and a third party via the target e-NB.

In another embodiment, an extended Node-B (e-NB) capable of being used for handoff of user equipment (UE) from a source extended Node-B (e-NB) to a target e-NB, the e-NB includes wireless communication circuitry, means for receiving a connection request message from the UE coupled to the wireless communication circuitry, the connection request message being received after a radio link failure of a communication link between the UE and source e-NB, means for forwarding the connection request message to a core communication network, means for receiving a connection setup message from the core network in response to the forwarded connection request message, and means for forwarding the connection setup message to the UE such that an active communication service at a service layer of the UE remains continuously active during the handoff while communication payload data transfer is re-established between the UE and a third party via the target e-NB.

In another embodiment, a computer program product includes a computer-readable medium, which includes a set of one or more instructions for receiving a connection request message from a UE coupled to a wireless communication circuitry, the connection request message being received after a radio link failure of a communication link between the UE and a source e-NB, a set of one or more instructions for forwarding the connection request message to a core communication network, a set of one or more instructions for receiving a connection setup message from the core network in response to the forwarded connection request message, and a set of one or more instructions for forwarding the connection setup message to the UE such that an active communication service at a service layer of the UE remains continuously active during the handoff while communication payload data transfer is re-established between the UE and a third party via the target e-NB.

BRIEF DESCRIPTION OF THE DRAWINGS

The features and nature of the present disclosure will become more apparent from the detailed description set forth below when taken in conjunction with the accompanying drawings in which reference characters identify corresponding items.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principals described are not to be limited to a single embodiment, but may be expanded for use with any of the other methods and systems described herein as will be understood by one of ordinary skill in the art unless otherwise stated specifically.

It is to be appreciated that the methods and systems disclosed below may relate to both mobile and non-mobile systems including mobile phones, PDAs and lap-top PCs, as well as any number of specially equipped/modified music players (e.g., a modified Apple iPOD®), video players, multimedia players, televisions (both stationary, portable and/or installed in a vehicle), electronic game systems, digital cameras and video camcorders that might implement wireless communication technology.

Figure 1:
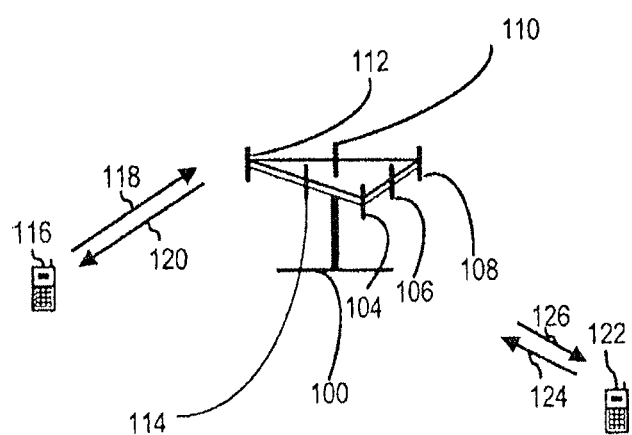
FIG. 1 depicts an exemplary wireless communication system having an access point and a number of access terminals.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point.

In communication over forward links 120 and 126, the transmitting antennas of access point 100 may utilize beam-forming in order to improve the signal-to-noise ratio of forward links for the different access terminals 116 and 124. Also, an access point using beam-forming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node-B, or some other terminology. An access terminal may also be called an access terminal, user equipment (UE), a wireless communication device, terminal, access terminal or some other terminology.

It should be appreciated that, in a variety of embodiments, an access terminal and an access point may communicate with one another using a repetitive sequence known as a super-frame architecture. For example, pushing forward to FIG. 5 for a moment, the top stream of data 500 consists of a series of super-frames, including consecutive super-frames 502 and 504. Each of the super-frames 502 and 504 includes a super-frame beacon (SB) 512 followed by a series of alternating downstream (DS) frames (514, 518 and 522) and upstream (US) frames (516, 520 and 524).

In operation, the super-frame beacon 512 may be transmitted by an access point in order to provide access terminals important information about the access point, including identification and synchronization information that an access terminal may use to synchronize, establish contact and maintain communication with the access point. Once communication is established, the access terminal may send information to the access point in any or all of the US frames and receive information from the access point in any or all of the DS frames. It should be noted, however, that during US frame time periods where an access terminal is actively transmitting, the access terminal may be unable to receive data or even sense the presence of another transmitted signal.

Figure 2:
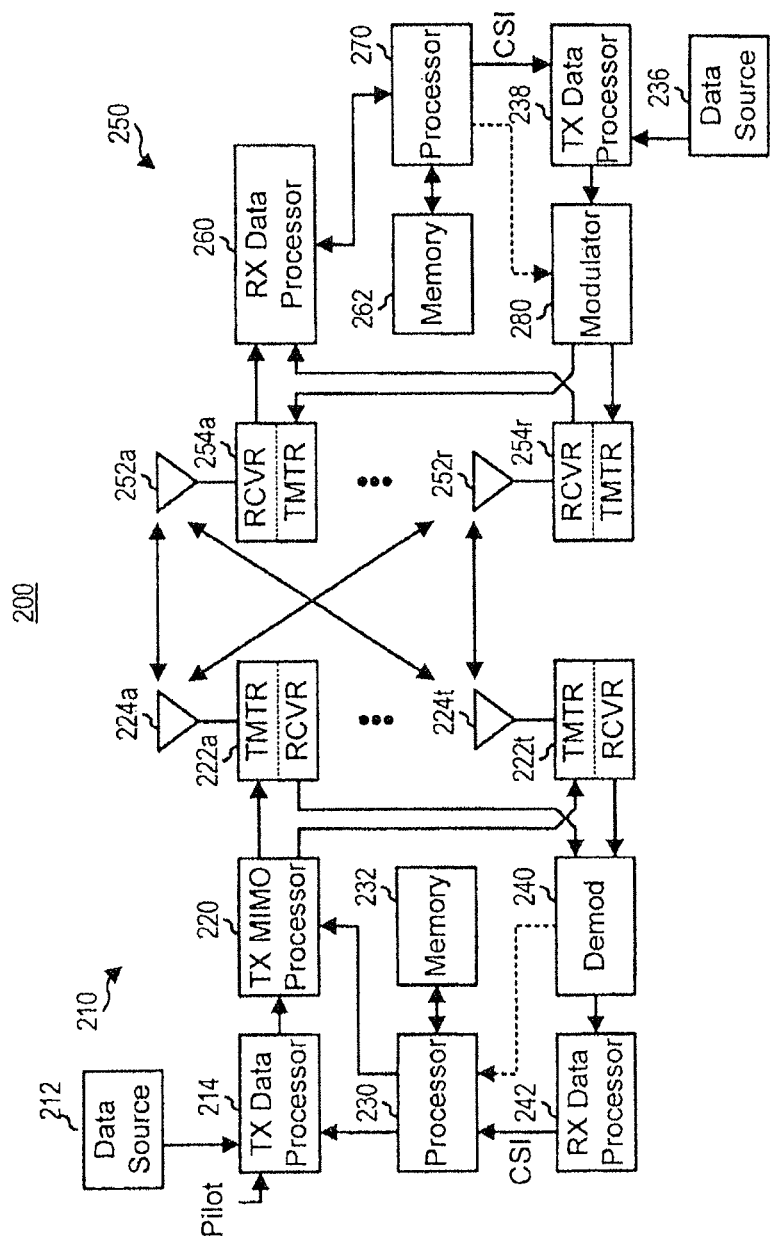
FIG. 2 depicts details of the exemplary access point and an exemplary access terminal.

Jumping back to FIG. 2, a block diagram of an embodiment of a transmitter system 210 (also known as the access point) and a receiver system 250 (also known as access terminal) in a MIMO system 200 is shown. At the transmitter system 210, traffic data for a number of data streams is provided from a data source 212 to a transmit (TX) data processor 214.

In a series of embodiments, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beam-forming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

Generally, processors 230 and 270 of FIG. 2 would be responsible for the overall formatting of the various streams of symbols/data to and from each other. That is, the exemplary processors 230 and 270 of FIG. 2 would be central in performing the functions of Media Access Controllers (MACs) (respectively depicted as MAC 231 and MAC 271), and thus they would be responsible for forming the overall communication structure discussed above with respect to FIG. 5 and discussed below with respect to FIGS. 5-8.

The reverse link message may include various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beam-forming weights then processes the extracted message.

In an aspect, logical channels are classified into Control Channels and Traffic Channels. Logical Control Channels includes Broadcast Control Channel (BCCH), which is DL channel for broadcasting system control information; Paging Control Channel (PCCH), which is DL channel that transfers paging information; and Multicast Control Channel (MCCH), which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In one aspect, Logical Traffic Channels can include a Dedicated Traffic Channel (DTCH), which is a point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels includes a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels includes a Random Access Channel (RACH), a Request Channel (REQCH), a Uplink Shared Data Channel (UL-SDCH) and plurality of PHY channels. The PHY channels include a set of DL channels and UL channels.

The DL PHY channels may include: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH).

The UL PHY Channels may include: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

In an aspect, a channel structure is provided that preserves low PAR (at any given time, the channel is contiguous or uniformly spaced in frequency) properties of a single carrier waveform.

Figure 3:
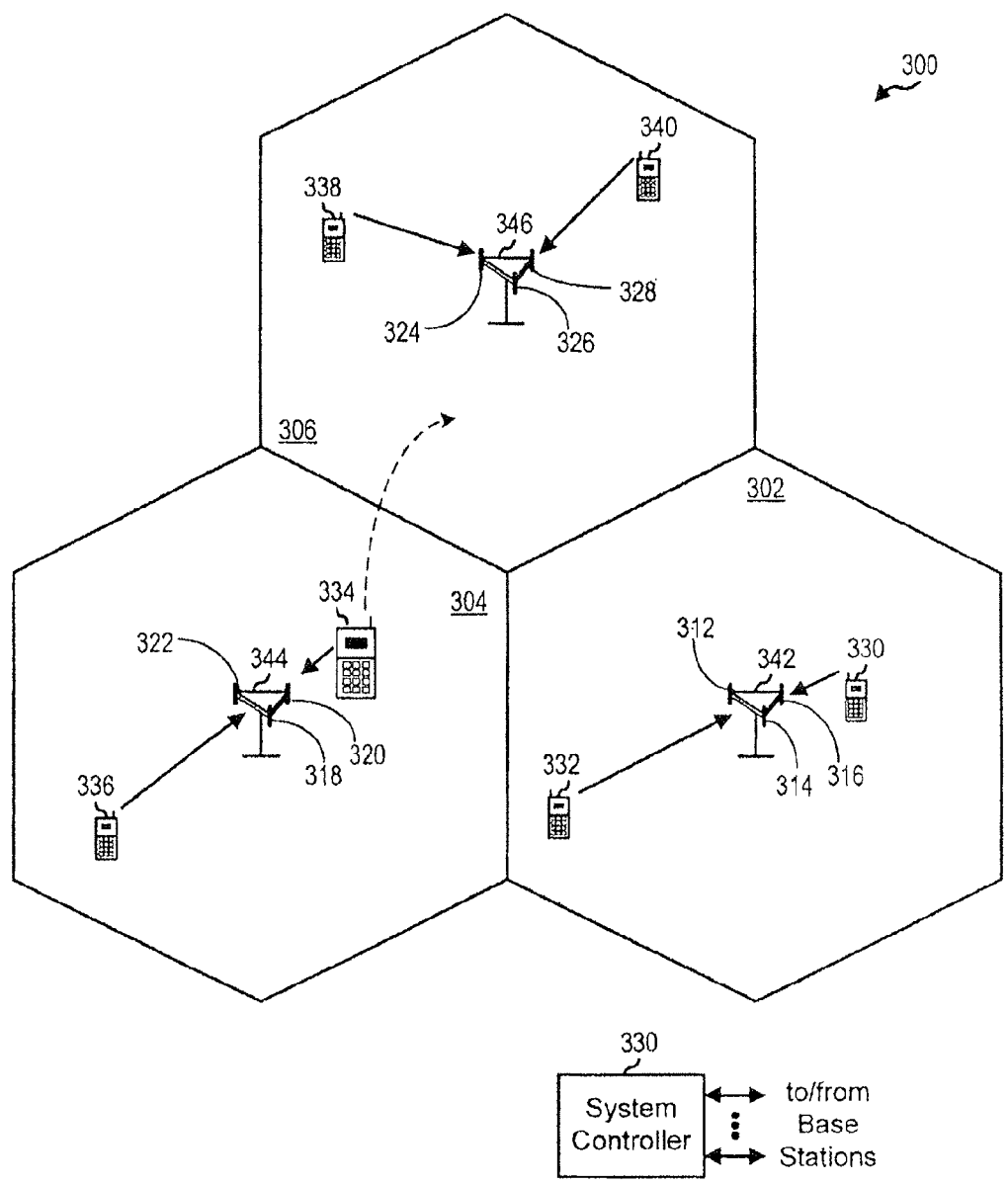
FIG. 3 depicts an access terminal migrating from a first wireless cell to a second wireless cell.

Referring to FIG. 3, a multiple access wireless communication system 300 according to one aspect is illustrated. The multiple access wireless communication system 300 includes multiple cells, including cells 302, 304, and 306. In the aspect of FIG. 3, each cell 302, 304, and 306 may include an access point that includes multiple sectors. The multiple sectors can be formed by groups of antennas with each antenna responsible for communication with access terminals in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector.

Each cell 302, 304 and 306 can include several wireless communication devices, e.g., User Equipment or access terminals, which can be in communication with one or more sectors of each cell 302, 304 or 306. For example, access terminals 330 and 332 can be in communication with access point 342, access terminals 334 and 336 can be in communication with access point 344, and access terminals 338 and 340 can be in communication with access point 346.

If one of the access terminals moves from its respective sector, then its communication with the respective access point associated with that sector may deteriorate. For example, should access terminal 334 move from sector 304, then its communication capacity with the access point 344 may deteriorate as access terminal 334 moves away from access point 344.

Figure 4:
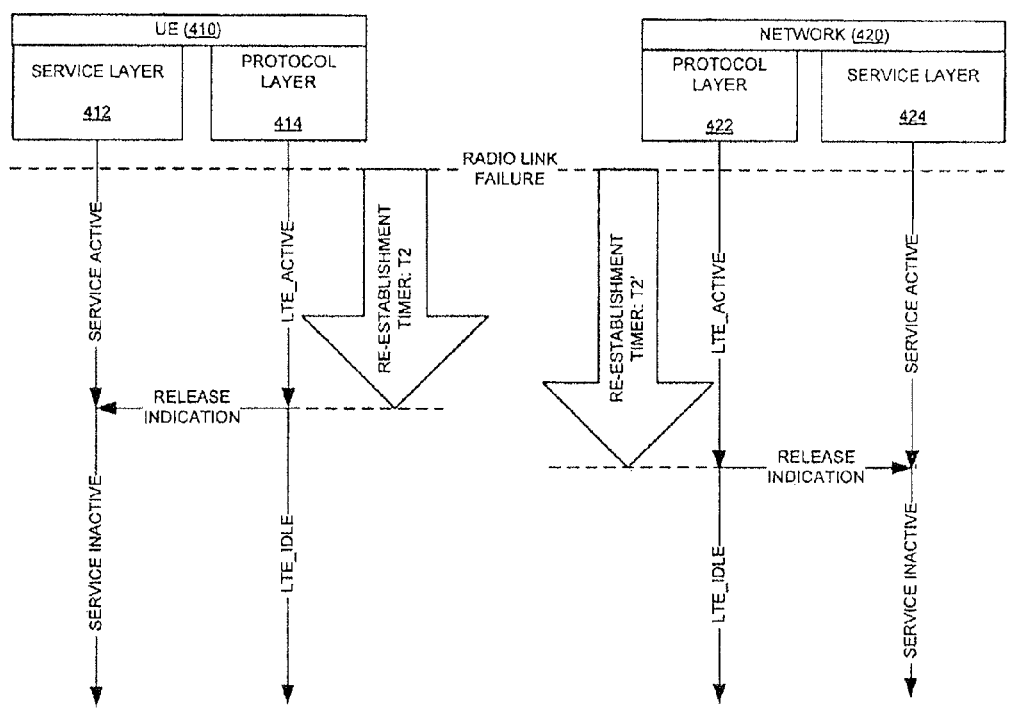
FIGS. 4 and 5 depict the interruption of a service layer upon radio link failure.

In the present example, access terminal 334 is depicted as moving to cell 306 in FIG. 4 (at 334'). In such circumstances, the access terminal 334-334' may be better served if it establishes communications with access point 346 in cell 306. For convenience of description this will be referred to as a "handoff" from an established access point to a target access point.

In making the handoff from cell 304 to cell 306, information relating to access terminal 334-334' can be sent to the target access point 346 via the established access point 344. Such a data transfer may speed access to the target access point 346. Similarly, the target access point 346 may communicate certain data to the access terminal through the established access point 344, with such information including timing/synchronization data and data relating to any resources provided to the access terminal 334-334' by the target access point 346.

3GPP LTE (Long Term Evolution) is the name given to a project within the Third Generation Partnership Program to improve the Universal Mobile Telecommunications System (UMTS) mobile phone standard to cope with future requirements. In Evolved Universal Terrestrial Radio Access Network (E-UTRAN), RRC Connection Establishment is done via LTE_IDLE state. The state transition for the RRC Connection Establishment needs to be distinguished by the network from the normal state transition from LTE_IDLE to LTE_ACTIVE. The present disclosure provides a novel method to enable the distinction by the network.

FIG. 4 depicts a communication system undergoing an interruption of a service layer upon radio link failure. As shown in FIG. 4, the communication system includes a UE 410 and a supporting communication network 410 with the UE 410 having a service layer 412 and a protocol layer 414, and the network 420 having its own service layer 422 and a protocol layer 424.

In operation, the communication system is shown to undergo a radio link failure (RLF) while two separate timers, T2 and T2', service the UE 210 and network 420 respectfully. Typically, an RLF is detected/determined using any number of metrics, such as low signal strength, unsuccessfully received packets, bit errors, and so on. RLF at the network side is recognized either by a similar process or by the reception of some upstream signal sent by the UE 410.

As timer T2 expires, the UE's protocol layer 414 transitions from an LTE_ACTIVE state to an LTE_IDLE state while the service layer goes from active to inactive. A similar transition occurs on the network side as timer T2' (typically longer than timer T2) expires.

Note that, as the respective service layers 412 and 424 go inactive, the communication signal serviced by the service layers 412 and 424 will be discontinued, and subsequent re-establishment of the radio signal may require the reactivation of the service layers 412 and 424. In such case of de-activation, a service drop will be experienced by the user.

For newly developed wireless communication systems, such as E-UTRAN, a current working assumption is that UE controlled mobility can be performed via LTE_IDLE without causing a service drop in the application layer.

Figure 5:
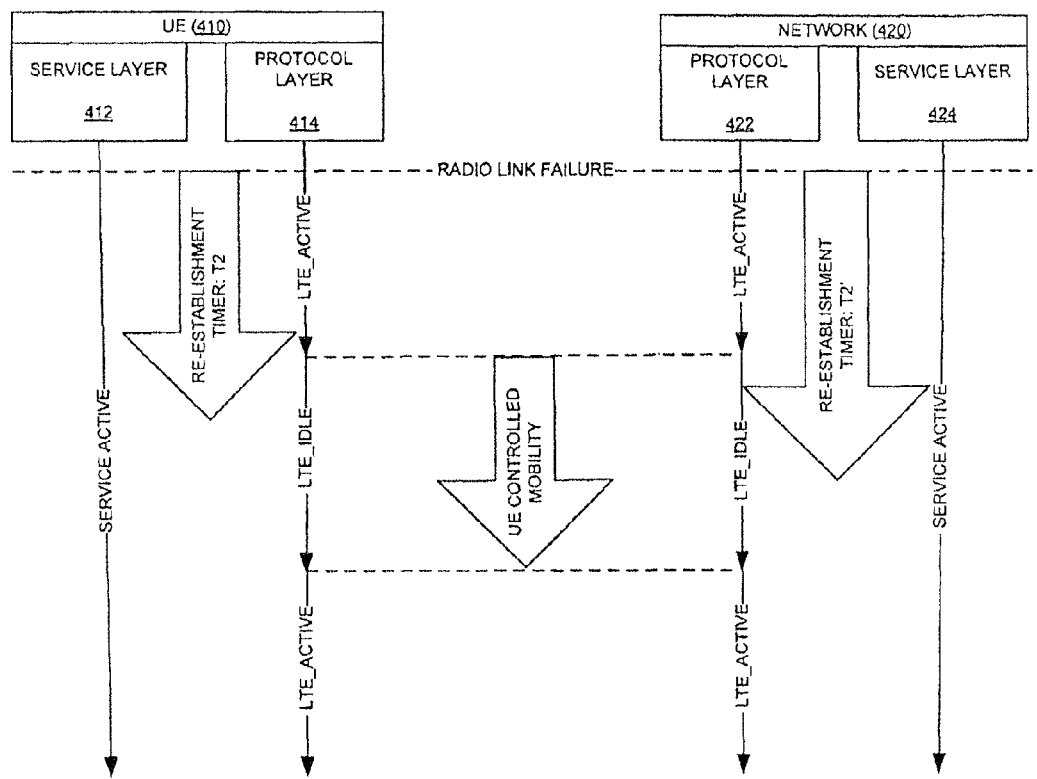

As depicted in FIG. 5, the UE protocol layer 414 may not indicate the connection release to the service layer 412 at UE controlled mobility. However, this can be achieved by the protocol layer 414 having the concept of "re-establishment sub-state" in LTE_IDLE state. An RRC context may not relocated in the UE controlled mobility, and thus the RRC may enter an RRC_IDLE state during this sub-state, and an NAS layer in the UE may have to manage this sub-state.

In such a re-establishment sub-state, the NAS layer in the UE keeps the current status for the service. Also the MME/UPE may not release the operable context of the UE so that the service and corresponding SAE access bearer can be continuous after a temporary LTE_IDLE state.

Figure 6:
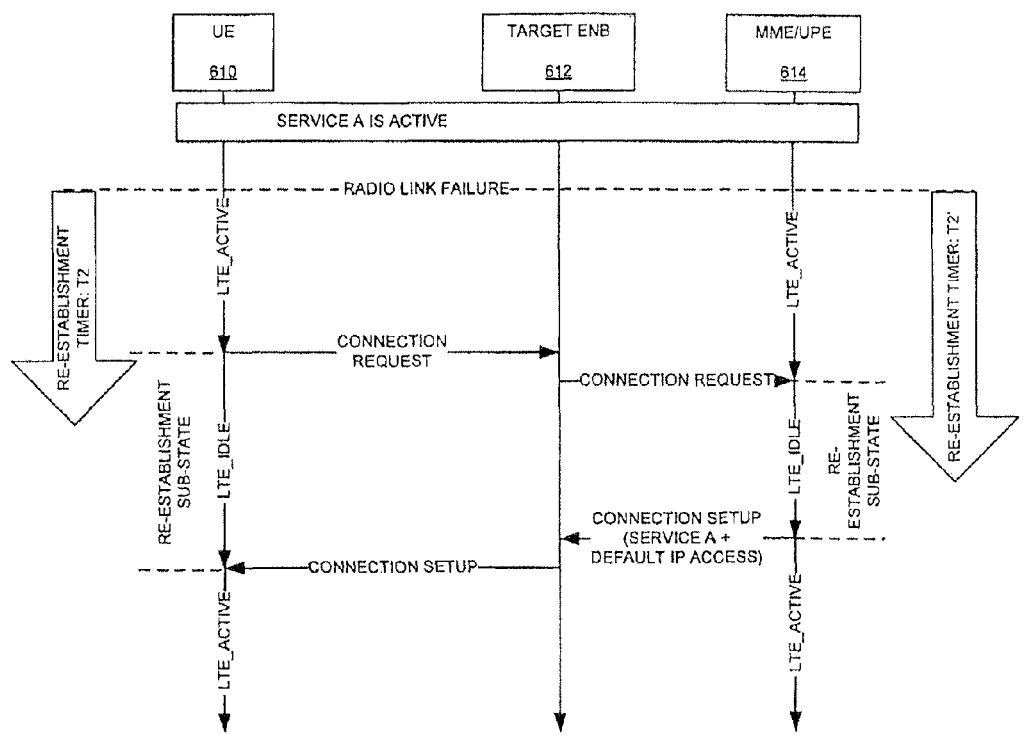
FIG. 6 depicts the interruption of a service layer upon radio link failure during a handoff.

FIG. 6 depicts the interruption of a service layer upon radio link failure during which a handoff from a UE 610 is made from a source e-NB (not shown) to a target e-NB 612, which is in turn supported by MME/UPE (its supporting core network for the present example). Note that for this example, all communication links may be enabled by any number of wired and wireless communication links supported by any number of communication circuitry modules, processors, software and so on.

Figure 7:
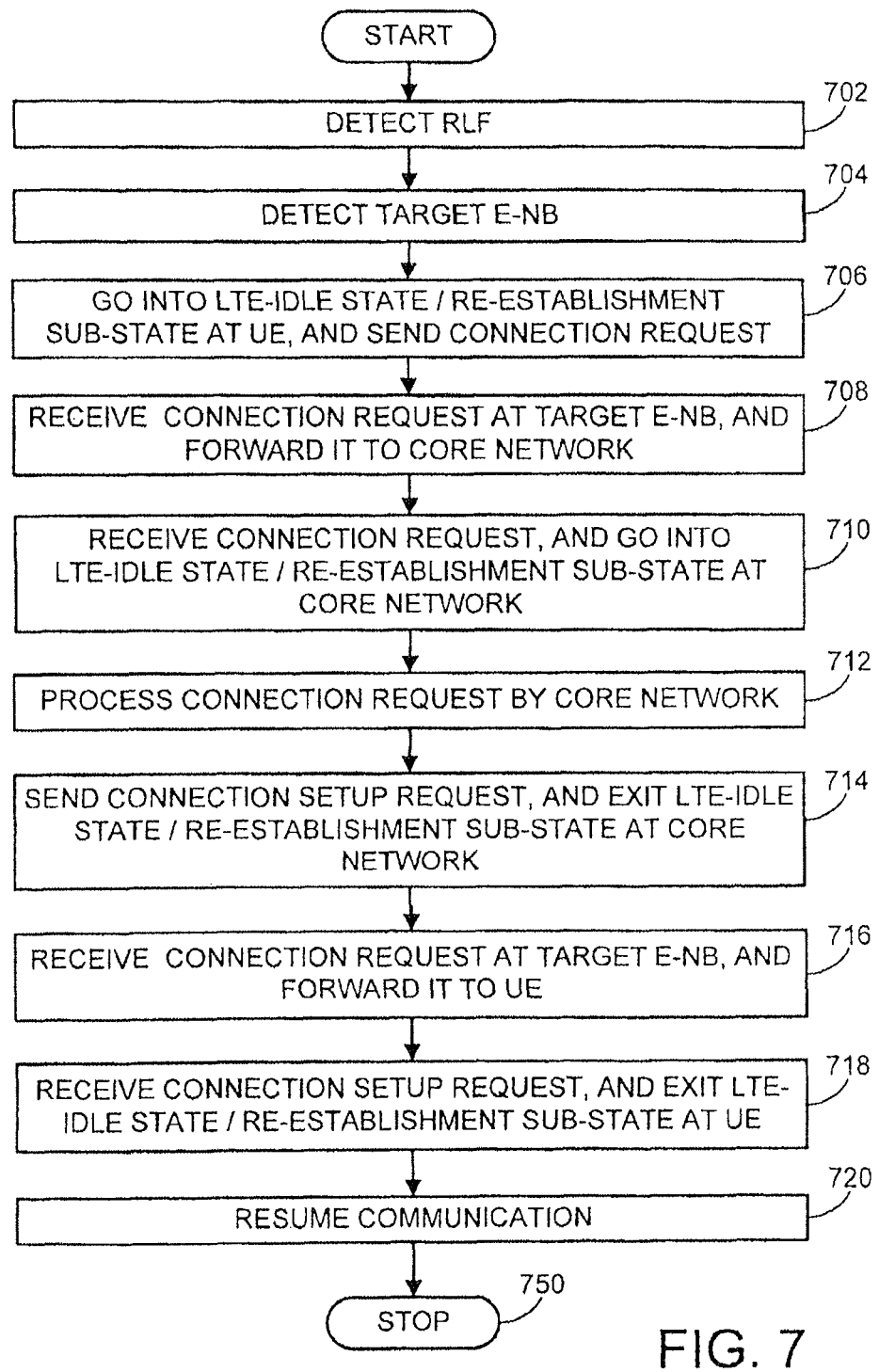
FIG. 7 is a flowchart outlining an exemplary operation of the disclosed methods and systems.

An exemplary communication re-establishment operation for the communication system of FIG. 6 is outlined by the flowchart of FIG. 7. Note that the communication system and respective operations allow for an RLF between the UE 610 and a source e-NB (again not shown) while maintaining an active communication service at a service layer of the UE 610 and a third party. Thus, the UE 610 may perform a handoff to the target e-NB 612 such that a communication service can remain continuously active during the handoff. For example, the UE 610 may be receiving some form of media delivery, e.g., receiving a movie real-time and/or undergoing an interactive voice service, e.g., a phone call, with nothing more than a minor discontinuity in service. No dropped service is necessary as with previously known systems and methods.

The process starts in step 710 where an RLF is detected, and thus a communication service between a UE and third party, supported by a source e-NB and core network, may be interrupted. For example, assuming the UE is receiving a real-time news broadcast, the sound at the UE may cease upon RLF. Next, in step 704, a target e-NB, such as the target e-NB 612 of FIG. 6, may be detected by the UE. Control continues to step 706.

In step 706, the UE may transition from an active state to a special idle state/reestablishment sub-state while sending a connection request message to the target e-NB. Note that, unlike previous technology, the present idle state/re-establishment sub-state may not require the respective service layer of the UE to cease operation of a connection service. That is, the underlying process supporting a communication can continue even though the payload data of the communication service is unavailable. Note that, the connection request message to the target e-NB may include information relating to maintaining the active communication service, such as a flag indicating that the UE is going into a service re-establishment sub-state, rather than cease operation at the service layer.

In step 708, the connection request message can be received by the target e-NB, and forwarded by the target e-NB to a core communication network. Next, in step 710, the forwarded connection request message may be received by the core network, and as a result the core network may transition from an active state to its own modified idle state/re-establishment sub-state. Then, in step 712, the core network can perform the underlying processes useful to re-establish communication consistent with a handoff. Control continues to step 714.

In step 714, the core network may send an appropriate connection setup message/request to the target e-NB, and exit its modified idle state/re-establishment sub-state to an active state again. Next, in step 716, the connection setup message can be received by the target e-NB, and forwarded by the target e-NB to the UE. Then, in step 718, the UE can receive the connection setup message, and exit its modified idle state/re-establishment sub-state to an active state again. Control continues to step 720.

In step 720, communication between the UE and the appropriate third party can be resumed, i.e., payload data is actively transferred again, and control continues to step 750 where the process stops.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of wireless handoff of a user equipment (UE) from a source base station to a target base station, the method comprising:
    detecting a radio link failure (RLF) between the UE and the source base station by the UE, the RLF interrupting a communication service between the UE and a third party at a protocol layer of the UE;
    sending, after detecting the RLF, a connection request message to the target base station to initiate the handoff, the connection request message including an indication that the UE is transitioning from an active state to a service re-establishment sub-state, the service re-establishment sub-state allowing the communication service to remain continuously active during the handoff; and
    maintaining the communication service between the UE and the third party at a service layer of the UE as the UE is handed off from the source base station to the target base station.

2. The method of claim 1, further comprising managing the service re-establishment sub-state with a non-access stratum (NAS) layer of the UE.

3. The method of claim 2, further comprising:
    receiving a connection setup message from a core communication network via the target base station in response to the connection request message;
    exiting the service re-establishment sub-state; and
    reentering the active state.

4. The method of claim 3, further comprising resuming payload data transfer of a first communication between the UE and the third party via the target base station.

5. The method of claim 2, wherein the NAS layer of the UE maintains a current status for the communication service during the service re-establishment sub-state.

6. The method of claim 1, wherein the connection request message is sent to the target base station during the service re-establishment sub-state and while maintaining the communication service at the service layer of the UE.

7. The method of claim 1, wherein the connection request message comprises information relating to maintaining the communication service and indicating that the UE is maintaining operation at the service layer.

8. The method of claim 1, further comprising detecting the target base station after detecting the RLF.

9. The method of claim 1, further comprising not indicating a connection release to the service layer by a UE protocol layer.

10. The method of claim 1, wherein the communication service includes at least one of a media delivery service and interactive voice service.

11. An apparatus for wireless communication of a user equipment (UE) that is capable of a handoff from a source base station to a target base station, the apparatus comprising:
    means for detecting a radio link failure (RLF) between the UE and the source base station by the UE, the RLF interrupting a communication service between the UE and a third party at a protocol layer of the UE;
    means for sending, after detecting the RLF, a connection request message to the target base station to initiate the handoff, the connection request message including an indication that the UE is transitioning from an active state to a service re-establishment sub-state, the service re-establishment sub-state allowing the communication service to remain continuously active during the handoff; and
    means for maintaining the communication service between the UE and the third party at a service layer of the UE as the UE is handed off from the source base station to the target base station.

12. The apparatus of claim 11, further comprising means for managing the service re-establishment sub-state with a non-access stratum (NAS) layer of the UE.

13. The apparatus of claim 12, further comprising:
    means for receiving a connection setup message from a core communication network via the target base station in response to the connection request message;
    means for exiting the service re-establishment sub-state; and
    means for reentering the active state.

14. The apparatus of claim 13, further comprising means for resuming payload data transfer of a first communication between the UE and the third party via the target base station.

15. The apparatus of claim 12, wherein the NAS layer of the UE maintains a current status for the communication service during the service re-establishment sub-state.

16. The apparatus of claim 11, wherein the connection request message is sent to the target base station during the service re-establishment sub-state and while maintaining the communication service at the service layer of the UE.

17. The apparatus of claim 11, wherein the connection request message comprises information relating to maintaining the communication service and indicating that the UE is maintaining operation at the service layer.

18. The apparatus of claim 11, further comprising means for detecting the target base station after detecting the RLF.

19. The apparatus of claim 11, further comprising means for not indicating a connection release to the service layer by a UE protocol layer.

20. The apparatus of claim 11, wherein the communication service includes at least one of a media delivery service and interactive voice service.

21. An apparatus for wireless communication of a user equipment (UE) that is capable of a handoff from a source base station to a target base station, the apparatus comprising:
   a memory; and
   at least one processor coupled to the memory and configured to:
      detect a radio link failure (RLF) between the UE and the source base station by the UE, the RLF interrupting a communication service between the UE and a third party at a protocol layer of the UE;
      send, after detecting the RLF, a connection request message to the target base station to initiate the handoff, the connection request message including an indication that the UE is transitioning from an active state to a service re-establishment sub-state, the service re-establishment sub-state allowing the communication service to remain continuously active during the handoff; and
      maintain the communication service between the UE and the third party at a service layer of the UE as the UE is handed off from the source base station to the target base station.

22. The apparatus of claim 21, wherein the at least one processor is further configured to manage the service re-establishment sub-state with a non-access stratum (NAS) layer of the UE.

23. The apparatus of claim 22, wherein the at least one processor is further configured to:
   receive a connection setup message from a core communication network via the target base station in response to the connection request message;
   exit the service re-establishment sub-state; and
   reenter the active state.

24. The apparatus of claim 23, wherein the at least one processor is further configured to resume payload data transfer of a first communication between the UE and the third party via the target base station.

25. The apparatus of claim 22, wherein the NAS layer of the UE maintains a current status for the communication service during the service re-establishment sub-state.

26. The apparatus of claim 21, wherein the connection request message is sent to the target base station during the service re-establishment sub-state and while maintaining the communication service at the service layer of the UE.

27. The apparatus of claim 21, wherein the connection request message comprises information relating to maintaining the communication service and indicating that the UE is maintaining operation at the service layer.

28. The apparatus of claim 21, wherein the at least one processor is further configured to detect the target base station after detecting the RLF.

29. The apparatus of claim 21, wherein the at least one processor is further configured to not indicate a connection release to the service layer by a UE protocol layer.

30. The apparatus of claim 21, wherein the communication service includes at least one of a media delivery service and interactive voice service.

31. A non-transitory computer-readable medium storing computer executable code, comprising code to:
   detect a radio link failure (RLF) between a user equipment (UE) and a source base station by the UE, the RLF interrupting a communication service between the UE and a third party at a protocol layer of the UE;
   send, after detecting the RLF, a connection request message to a target base station to initiate a handoff, the connection request message including an indication that the UE is transitioning from an active state to a service re-establishment sub-state, the service re-establishment sub-state allowing the communication service to remain continuously active during the handoff; and
   maintain the communication service between the UE and the third party at a service layer of the UE as the UE is handed off from the source base station to the target base station.

* * * * *